United States Patent [19]
Roth

[11] Patent Number: 5,597,352
[45] Date of Patent: Jan. 28, 1997

[54] SEPARATOR SCREEN AND SCREENING METHOD

[75] Inventor: Eldon Roth, Dakota Dunes, S. Dak.

[73] Assignee: Freezing Machines, Inc., Dakota Dunes, S. Dak.

[21] Appl. No.: 556,712

[22] Filed: Nov. 13, 1995

Related U.S. Application Data

[63] Continuation-in-part of Ser. No. 482,420, Jun. 8, 1995, abandoned, which is a continuation-in-part of Ser. No. 355,644, Dec. 14, 1994, abandoned.

[51] Int. Cl.⁶ ................................................. A22C 17/06
[52] U.S. Cl. .......................................................... 452/138
[58] Field of Search .................................... 452/138, 135

[56] References Cited

U.S. PATENT DOCUMENTS

| | | | |
|---|---|---|---|
| Re. 32,060 | 12/1985 | McFarland | 452/138 |
| 3,762,658 | 10/1973 | Barnes . | |
| 3,847,360 | 11/1974 | Seydelmann . | |
| 3,917,178 | 11/1975 | Barnes . | |
| 3,934,827 | 1/1976 | Seydelmann . | |
| 4,004,742 | 1/1977 | Hess . | |
| 4,575,899 | 3/1986 | Prosenbauer | 452/138 |
| 4,699,325 | 10/1987 | Hess . | |
| 4,708,296 | 11/1987 | Powers et al. . | |
| 5,041,055 | 8/1991 | Roth | 452/138 |
| 5,160,290 | 11/1992 | Richburg | 452/138 |
| 5,251,829 | 10/1993 | Lesar . | |
| 5,289,979 | 3/1994 | Lesar . | |
| 5,306,202 | 4/1994 | Meeker | 452/138 |
| 5,344,086 | 9/1994 | Lesar . | |
| 5,405,095 | 4/1995 | Lesar . | |

FOREIGN PATENT DOCUMENTS

| | | |
|---|---|---|
| 0219754 | 4/1986 | European Pat. Off. . |
| 46721 | 3/1920 | Sweden . |
| 1386299 | 4/1988 | U.S.S.R. . |
| 1768297 | 10/1992 | U.S.S.R. . |

*Primary Examiner*—Willis Little
*Attorney, Agent, or Firm*—Russell D. Culbertson; Shaffer & Culbertson

[57] ABSTRACT

A screen for use in a separator device includes an inner portion opening onto the screen inner surface and an outer portion extending the remainder of the way through the screen material. The outer portion of the screen opening allows the desired material to pass therethrough, while blocking the entry of large pieces of hard material. The inner portion of the screen opening includes a deflecting surface forming an acute deflecting angle with the inner screen surface in the direction at which a cutting element passes over the screen opening. Large pieces of hard material that may partially enter the screen opening are pressed against the deflecting surface as the cutting element passes over the screen opening, the deflecting surface serving to deflect the hard material out of the screen opening without chipping off or cutting off any of the hard material, which could then pass through the screen opening along with the desired material.

21 Claims, 5 Drawing Sheets

5,597,352

SEPARATOR SCREEN AND SCREENING METHOD

This application is a continuation-in-part of application Ser. No. 08/482,420 filed on Jun. 8, 1995, now abandoned, which was a continuation-in-part of application Ser. No. 08/355,644 filed on Dec. 14, 1994, now abandoned.

BACKGROUND OF THE INVENTION

This invention relates to screens for use in meat separators and particularly to a screen opening for preventing small pieces of bone and other hard material from passing through the screen along with the desired meat products.

Certain meat product and bone separator devices operate by forcing the combined meat products and bones against a screen. The screen has openings therethrough having a size sufficient for allowing the desired meat product to pass therethrough while blocking the large pieces of bone and other undesirable material to be removed from the meat products. To prevent the screen from plugging up, a blade or other cutting element is periodically passed across the screen surface and over the screen openings. The cutting element severs the meat products between the edge of the cutting element and the edge of the screen openings, thereby allowing more meat product material to enter the screen openings and forcing the severed part of the material on through the openings and out of the separator device. U.S. Pat. No. 5,041,055 shows an example of this type of meat separator. In the type of separator shown in this patent, an auger is used to compress material and also to cut the material at the surface of the screen.

Another type of separator includes a grinding plate or screen at an end of a conduit, and material is forced through the conduit and against the screen by an auger or other device. A blade at the end of the auger or a separate blade sweeps across the flat screen or grinding plate as the auger rotates. In this form of meat separator, channels formed in the grinder plate or screen guide bones and other hard material toward a central opening through which such material may pass.

Although bones and other hard material may be large enough not to pass through the screen openings in one piece, bones and other hard material may have corners or edges that may be forced into the portion of the screen openings adjacent the surface of the screen. When a bone piece or other hard material piece enters the screen openings adjacent to the surface of the screen and the cutting element passes over the opening, the cutting element may cut off a small portion of the bone or other hard material as is passes the screen opening. This small piece of bone or other undesirable material may then pass through the screen opening along with the desired meat products. The presence of these bone pieces or other hard material pieces lowers the quality of the separated meat products.

SUMMARY OF THE INVENTION

It is a general object of the invention to provide a separator screen and screening method for overcoming these and other problems associated with prior separator devices.

In order to accomplish this object, a screen according to the invention includes special screen openings that cooperate with the cutting edge of the cutting element to prevent parts of bone and other hard material from being caught in the screen openings and being broken or cut off as the cutting element passes. Each screen opening includes an outer portion and an inner portion. The outer portion of each screen opening may be any desired shape for allowing the desired meat product to pass while blocking bone and other hard material above a certain size. The inner portion of each screen opening includes a deflecting surface extending at an acute deflecting angle to the surface of the screen. The deflecting surface slopes toward the surface of the screen in the direction that the cutting element travels.

In operation, the cutting element passes over the screen openings similar to prior devices. Also, bone and other hard material may extend into the area of the screen openings adjacent to the surface of the screen, just as in prior devices. Soft material that has passed through the screen opening and is caught on the edge of the screen openings is severed by the cutting element as it passes over the edge of the screen opening facing the oncoming cutting element. However, as the cutting element passes over the openings, it pushes bone and other hard material against the deflecting surface, and the deflecting surface guides the material out of the openings without cutting off any portion of the material which could then pass through the screen.

These and other objects, advantages, and features of the invention will be apparent from the following description of the preferred embodiments, considered along with the accompanying drawings.

DESCRIPTION OF THE PREFERRED EMBODIMENTS

Figure 1:
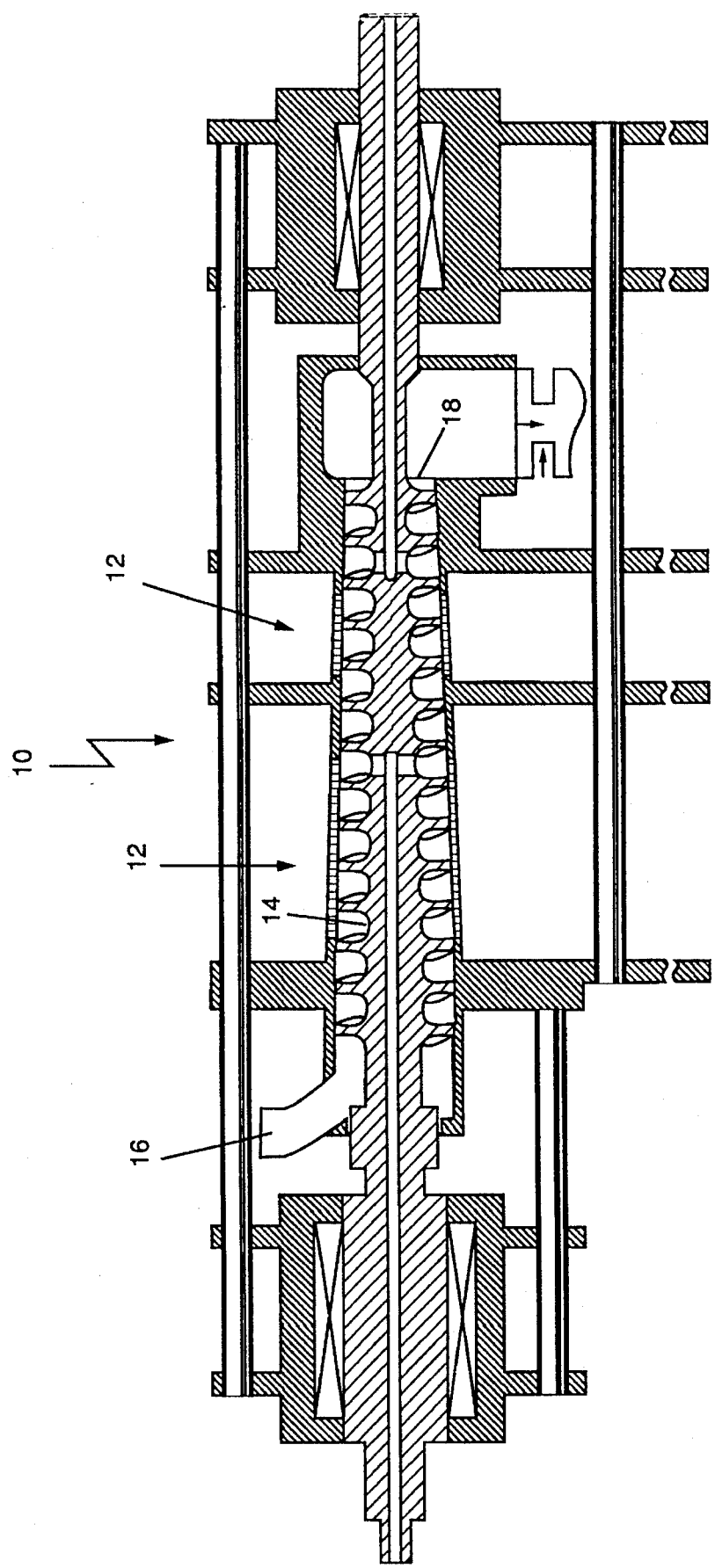
FIG. 1 is a view in longitudinal section of a separator device using a screen embodying the principles of the invention.

Referring to FIG. 1, a separator device 10 may include a screen 12, an auger 14, and input and output openings 16 and 18, respectively. The auger 14 compresses material within the separator device 10 to the right in the figure, and also the edge of the auger repeatedly cuts across the inner surface of the screen 12 as the auger rotates. The screen has small openings having a size sufficient to allow the desired soft material to pass therethrough, but not large enough to allow bone and other hard material to pass therethrough intact. The screen 12 shown in FIG. 1 is slightly tapered to form a generally frustoconical shape, tapering inwardly toward the output opening 18. However, those skilled in the art will appreciate that the screen 12 may be cylindrical and these shapes are to be considered equivalents for purpose of the following claims.

In operation, a mixture consisting of large bones and desirable meat products is placed into the device 10 through the input opening 16. The auger 14 rotates within the device to compress the material to the right in the figure. As the material is compressed, the desired soft meat products are squeezed through the openings in the screen 12. The edge of the auger 14 sweeps across the screen openings periodically to cut material caught on the edges of the screen openings, severing the material and allowing the severed portions to be pushed on and eventually out of the screen openings. Meanwhile, large bone pieces and other hard material is blocked by the screen openings and remains within the separator, eventually passing out the output opening 18 of the device 10.

Figure 2:
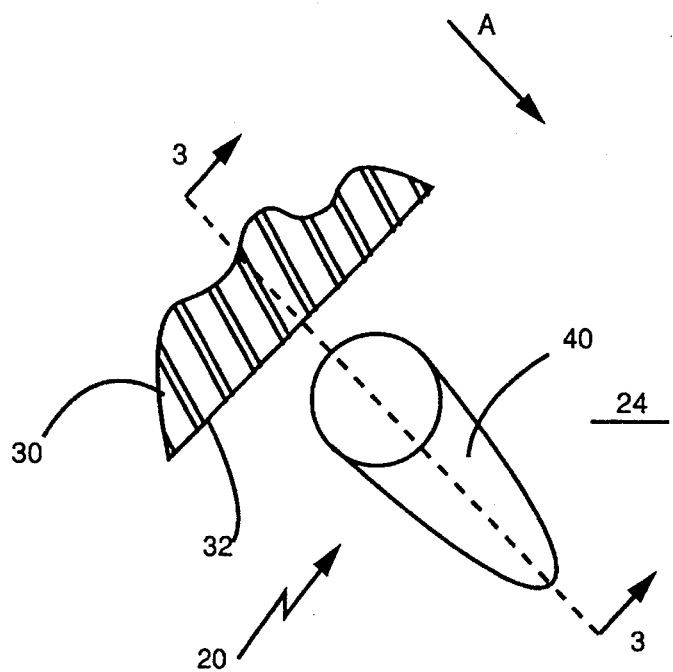
FIG. 2 is a plan view of a single screen opening, also showing a portion of a cutting element in section.
Figure 3:
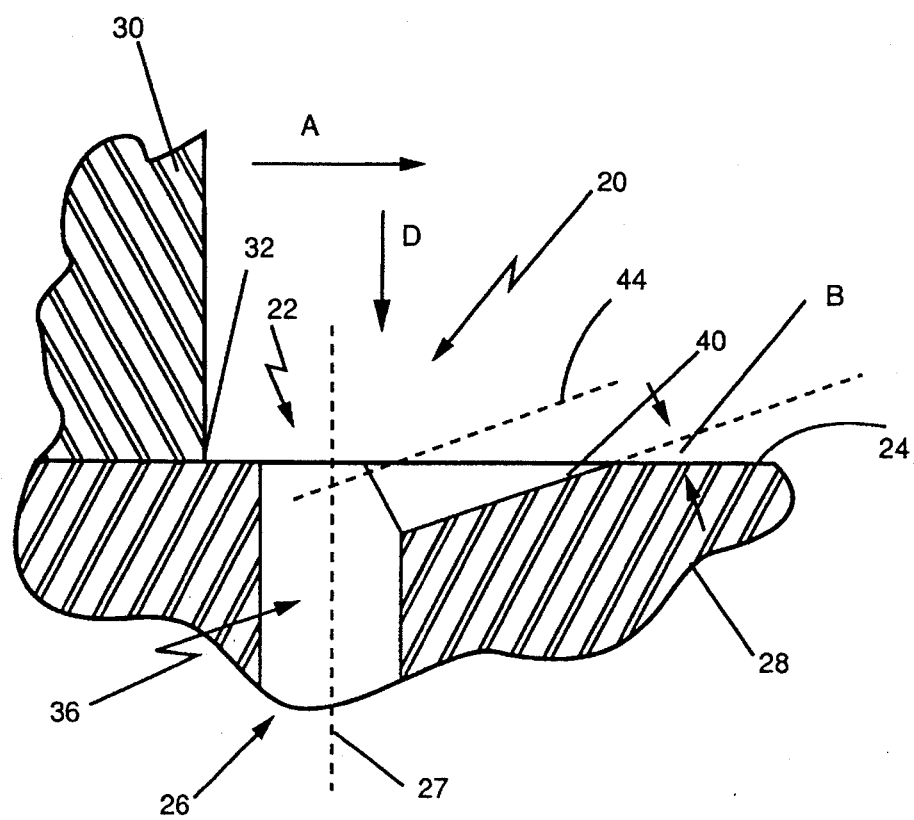
FIG. 3 is a view in transverse section taken along line 3—3 in FIG. 2.

A single preferred screen opening 20 is shown in FIGS. 2 and 3. The screen opening 20 includes an inner portion 22 that opens into the screen inner surface 24 and an outer portion 26 that extends the rest of the way through the screen body 28. FIGS. 2 and 3 also show a cutting element 30 having a cutting edge 32 in a position approaching the screen opening 20, traveling in a cutting direction A across the screen inner surface. In the example device shown in FIG. 1, the cutting element includes the auger 14. However, those skilled in the art will readily appreciate that the cutting element 30 may comprise any suitable cutting device with a suitable cutting edge 32 for severing the soft material. Also, FIGS. 2 and 3 show the cutting edge 32 of the cutting element 30, extending generally perpendicular to the cutting direction A, which is the preferred configuration. However, the cutting edge 32 could be at substantially any angle with respect to the cutting direction A.

The illustrated outer portion 26 of the opening 20 shown in FIGS. 2 and 3 has a generally cylindrical shape, with the axis 27 of the cylinder extending generally perpendicular to the inner screen surface 24. The diameter of the outer portion 26 may vary depending on the type of material being processed and may range generally from 0.065 inches to 0.1875 inches, although diameters outside of this size range may be employed within the scope of the invention. The cylindrical shape is preferred, although any cross-sectional shape may be used for the outer portion 26 of the screen opening 20. Also, it is not necessary that the longitudinal axis of the outer portion 26 be perpendicular to the inner screen surface 24, even though this perpendicular orientation is shown for purposes of example in the drawings.

Referring particularly to FIG. 3, the inner portion 22 of the screen opening 20 includes the continuation 36 of the cylinder forming the outer portion 26, which extends on and meets the inner screen surface 24. The inner portion 22 also includes a deflecting surface 40 that extends at an acute deflecting angle B to the inner screen surface 24. The deflecting surface 40 is oriented such that it slopes toward the inner screen surface 24 in the cutting direction indicated at arrow A in FIG. 3. The illustrated deflecting surface 40 comprises that portion of a second cylinder intersecting the screen body 28, with its axis in a plane extending perpendicular to the inner screen surface 24 and the cylinder diameter having substantially the same diameter as a cylinder forming the outer portion 26 of the screen opening 20. The longitudinal axis 44 of the second cylinder also intersects the axis 27 of the screen opening outer portion 26 and also lies in a plane that extends parallel to the cutting direction A. This preferred screen opening 20 may be produced by first drilling a cylinder through the screen body 28 to form the outer portion 26 of the screen operarig and then drilling into the screen inner surface 24 at the deflecting angle B with a suitable tool until intersecting the previously produced cylinder forming the screen opening outer portion 26. Although this mechanical drilling process is the preferred manufacturing process, the opening 20 may be made by EDM or any other suitable process. The depth of the inner portion 22 may be approximately three hundredths (0.030) of an inch, although other depths may be employed within the scope of the invention.

The deflecting angle B shown in FIG. 3 is approximately 15 degrees, although the preferred range of the deflecting angle may be from 15 degrees to about 20 degrees with respect to the screen inner surface 24. Those skilled in the art will readily appreciate that angles outside of this range my be used within the scope of the invention, although larger angles may reduce the effectiveness of the invention, as will be discussed below. It has been determined that the maximum effective deflecting angle for separating meat products is approximately 45 degrees. At deflecting angles above 45 degrees, relatively soft but still undesirable material, such as cartilage for example, may not be deflected and may remain with the meat as the meat passes through the remainder of the screen opening. Also, the deflecting surface 40 need not have a constant slope, but may be curved, either concave or convex, in the cutting direction A as will be discussed in connectionwith FIGS. 6–9. In particular, the intersection of the constant slop surface 40 and the cylindrical outer portion 26 preferably includes a convex curved or radiused surface.

The operation of the invention my be described now with reference to FIGS. 2 and 3. Material to be separated and bone and other hard material are first compressed against the screen inner surface 24 in the direction of arrow D in FIG. 3. The soft material to be separated is forced under this compression into the screen opening 20. The soft material tends to flow partially through the opening 20 and then catch on the side of the opening facing the oncoming cutting element 30. Periodically, the cutting element 30 passes over the screen opening 20, severing the material which caught in the screen opening against the edge of the opening facing the oncoming cutting element 30. After severing the material at the screen inner surface 24, more material is compressed into the opening 20, displacing the severed portion, which eventually passes on through the screen opening to be collected for further processing.

Periodically, a portion of a large piece of bone or other hard material may be small enough to be pressed into the screen opening inner portion 22, with the remainder of the hard material still extending into the interior of the screen area. As the cutting element 30 approaches the screen opening 20 having bone or other hard material extending partially therein, the cutting edge 32 hits the bone and presses it against the deflecting surface 40. The sloped deflecting surface 40 serves to guide hard material out of the screen opening 20 so that no portion of the hard material is cut or chipped off within the screen opening. Thus, the deflecting action prevents undesirable material from being broken off from larger pieces and then passing through the screen opening with the desired soft material. The deflecting surface 40 of each screen opening 20 serves to reduce impurities in the desired material separated using the separator device.

Figure 4:
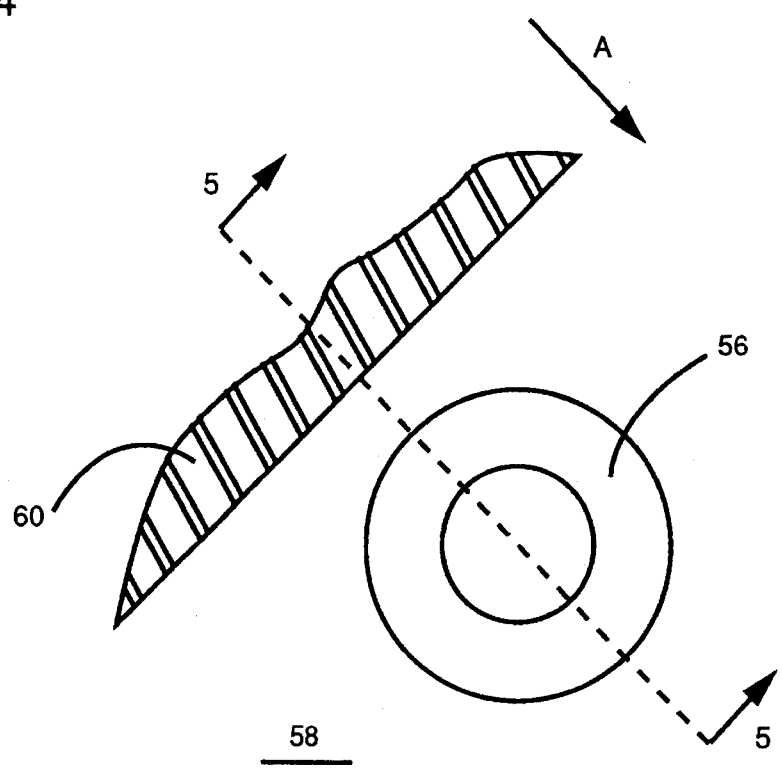
FIG. 4 is a plan view of an alternate screen opening embodying the principles of the invention, and also showing a portion of a cutting element in section.
Figure 5:
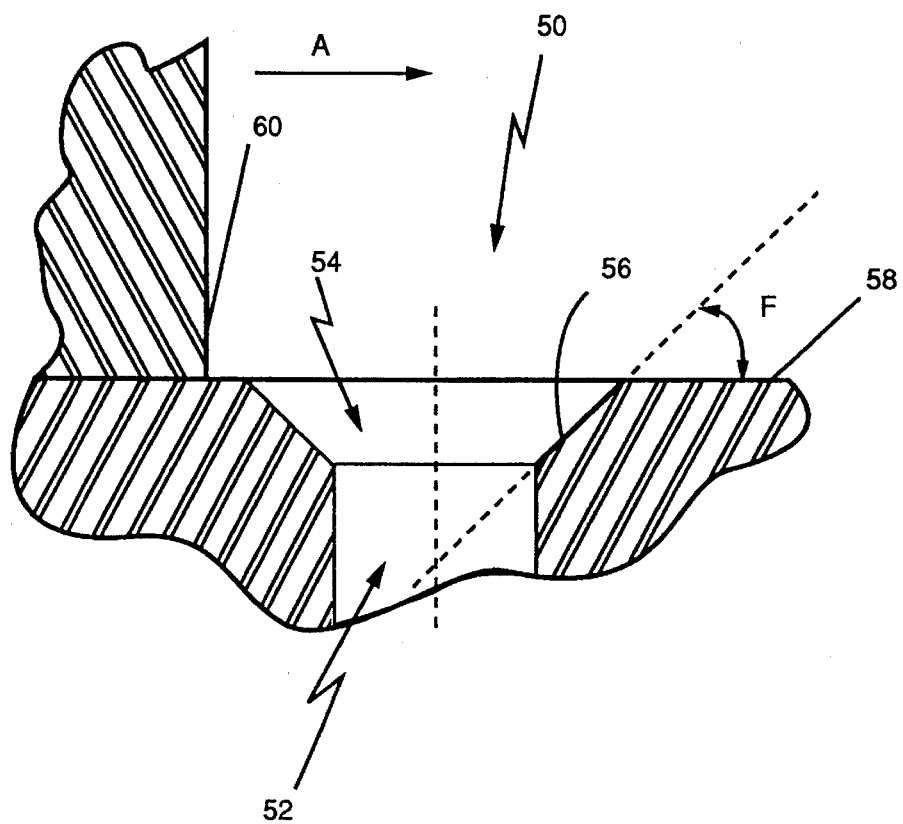
FIG. 5 is a view in transverse cross section taken along line 5—5 in FIG. 4.

FIGS. 4 and 5 show an alternative preferred screen opening 50. The outer portion 52 of the alternative screen opening 50 is cylindrical, similar to the outer portion of the opening shown in FIG. 3. In this form of the invention, however, the inner portion 54 of the screen opening 50 comprises a frustoconical surface 56 extending around the periphery of the cylinder forming the screen opening outer portion 52. The frustoconical surface 56 is coaxial with the cylindrical outer portion 52. Also, the frustoconical surface 56 provides an acute deflecting angle F with the screen inner surface 58. The deflecting angle F shown along the transverse section line 5—5 in FIG. 4 is preferably about 20 degrees, although the angle could be any acute angle under approximately 45 degrees within the scope of the invention. The larger angle still produces some deflection but has diminishing deflecting affect as the angle increases. Also, due to the frustoconical nature of the deflecting surface 56, the angle formed with the screen inner surface 58 varies around the half of the surface facing the oncoming cutting element 60. However, the varying deflecting angle still provides the deflecting function to deflect bone and other hard material out of the screen opening 50 as the cutting element passes.

One of the advantages of the form of the invention shown in FIGS. 4 and 5 is the simplicity of manufacture. The screen opening 50 may be produced by first drilling a cylindrical hole through the screen material and then drilling the frustoconical shape with a suitable tool, similar to producing a countersink for a screw. Another advantage of the embodiment shown in FIGS. 4 and 5 is that it is not sensitive to the cutting direction at which the cutting element passes. The deflecting surface formed by the frustoconical shaped inner portion 54 of the screen opening 50 faces the cutting element 60, regardless of the cutting direction at which the cutting element passes over the opening.

Figure 6:
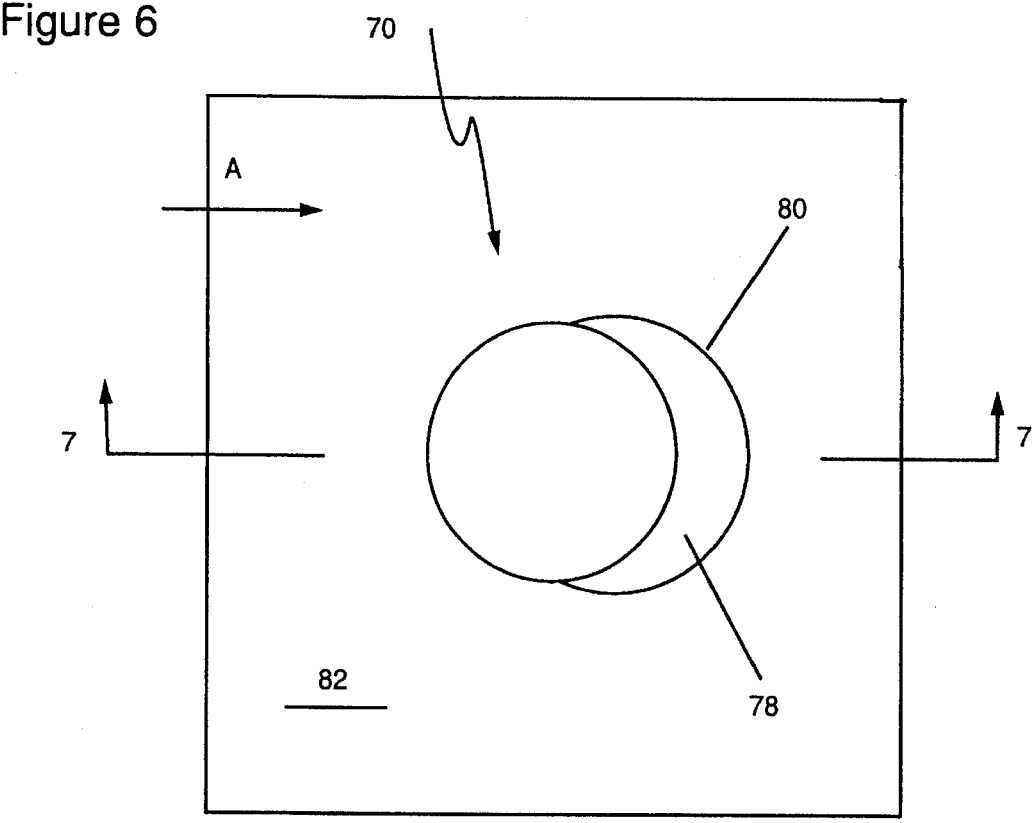
FIG. 6 is a plan view of an alternate screen opening embodying the principles of the invention.
Figure 7:
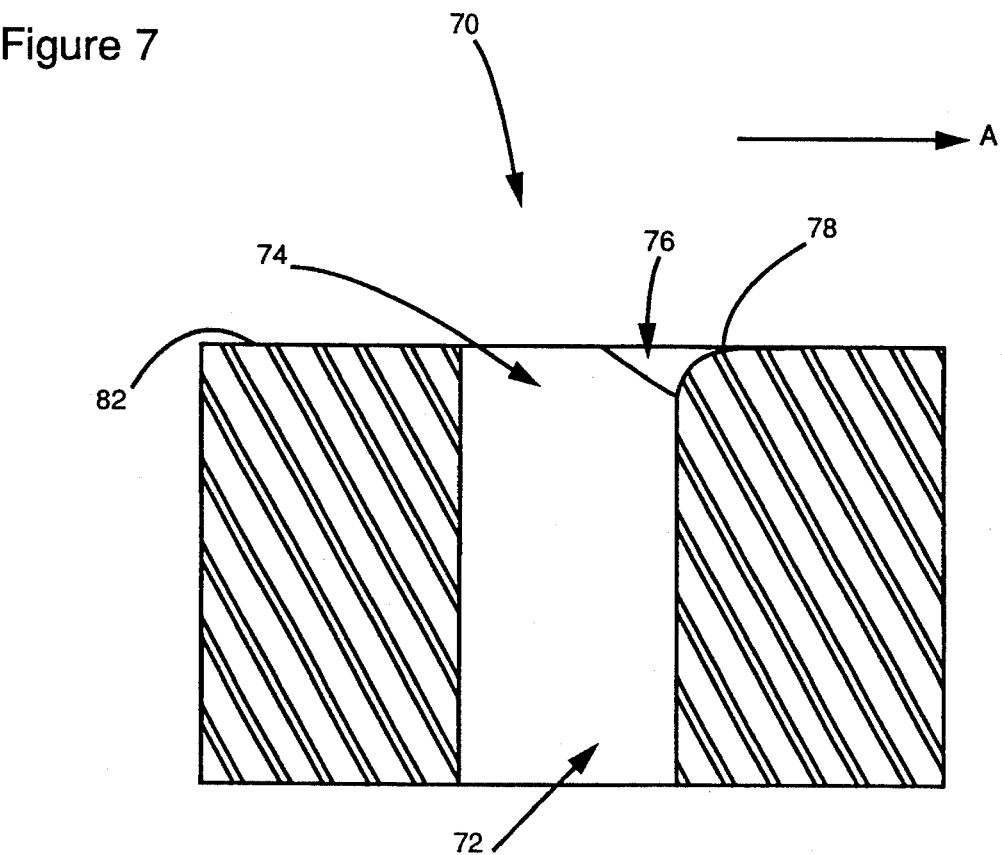
FIG. 7 is a view in transverse cross-section taken along line 7—7 in FIG. 6.

FIGS. 6 and 7 show another alternative preferred screen opening 70. The outer portion 72 of screen opening 70 is cylindrical as with previously disclosed embodiments. However, the inner portion 74 of the opening 70 includes a fluted section 76 having a convex deflecting surface 78. The top of the fluted section terminates in a circular shape 80 at the inner surface of the screen 82 with the circular shape having a diameter larger than the diameter of the outer portion 72 and having a center offset from the center of the outer portion 72 in the direction that the blade (not shown) passes over the opening 70 in cutting direction A. In the form of the invention shown in FIGS. 6 and 7, the deflecting surface comprises the convex or radiused surface 78 of the fluted section 76.

A number of different radii for the fluted section may be employed according to the invention depending upon a number of factors including the diameter of the outer portion 72, and particularly the type of material being screened or separated. For example, in one preferred form of the invention, the cylindrical outer portion 72 of the opening 70 may have a diameter of 0.085 inches and the radius of the fluted section may be 0.020 inches. For larger openings 70 such as where the diameter of the outer portion is 0.187 inches, the radius of the fluted section may be 0.050 inches. In any event, the radiused or convex deflecting surface 78 functions similarly to the deflecting surfaces described with reference to FIGS. 2–5. As the cutting blade (not shown in FIGS. 6 and 7) passes the opening 70 in direction A, any large pieces of bone or other hard material that enter the opening, contact the deflecting surface 78 as the blade passes in direction A, and the deflecting surface guides the bone or other hard material out of the opening without any corners or other portions of the material being caught on a cutting edge and breaking off so as to pass through the opening 70.

Figure 8:
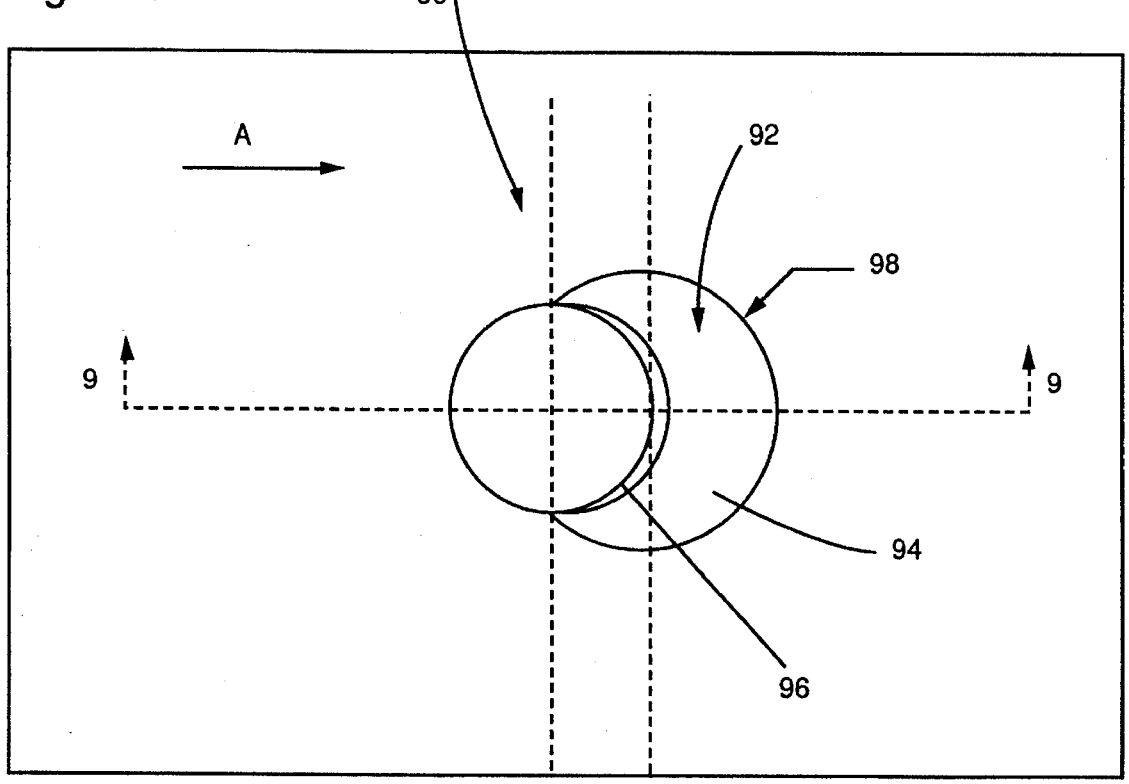
FIG. 8 is a plan view of another alternate screen opening embodying the principles of the invention.
Figure 9:
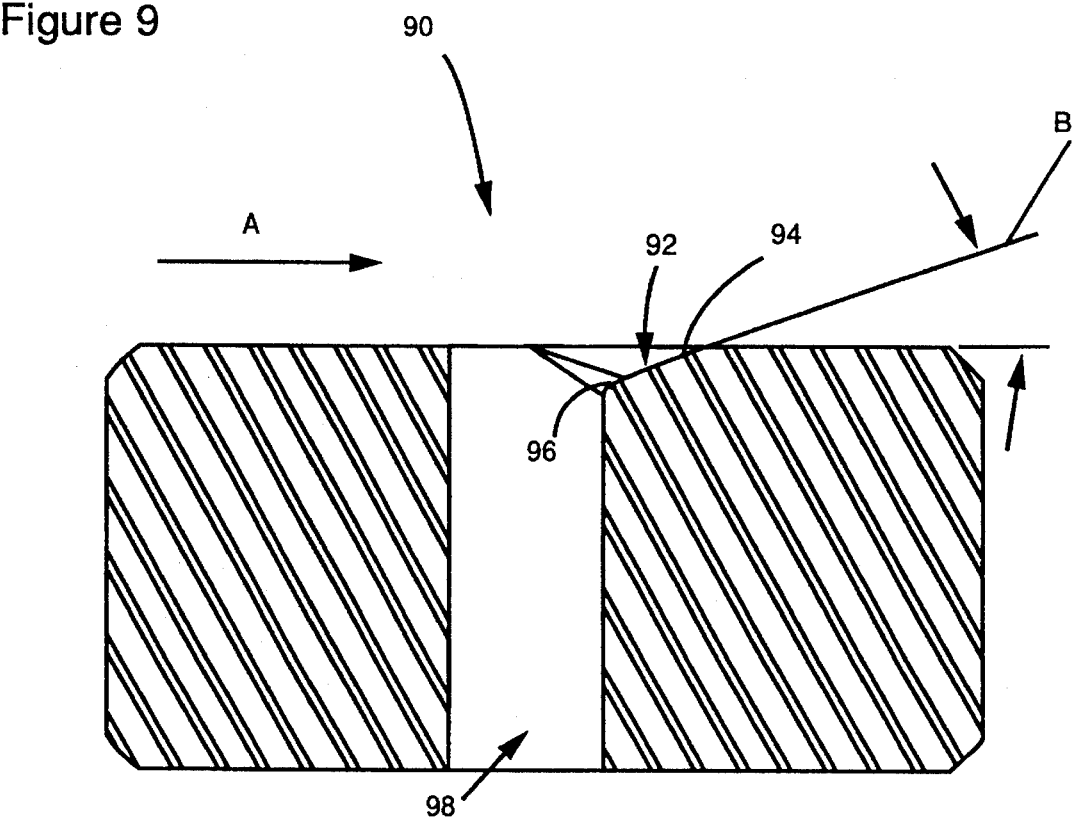
FIG. 9 is a view in transverse cross-section taken along line 9—9 in FIG. 8.

FIGS. 8 and 9 show another alternative screen opening 90. The screen opening 90 includes a deflecting surface 92 having a constant slope portion 94 and a convex curved or radiused section 96. As was with the previously discussed embodiments the opening 90 includes an outer portion 98 having a cylindrical shape. The constant slope portion 94 of the deflecting surface 92 defines a portion of a conical shape having a center axis offset in the direction A and parallel to the center axis of the outer portion 98. Direction A is the direction in which a cutting blade (not shown) passes over the screen opening 90. The convex curved or radiused section 96 connects the constant slope section 94 and the cylinder forming the outer portion 98 of the opening 90. In the preferred form of the invention the deflecting angle B of the constant slope surface is 18 degrees although any angle less than about 45 degrees may be employed within the scope of the invention.

The above described preferred embodiments are intended to illustrate the principles of the invention, but not to limit the scope of the invention. Various other embodiments and modifications to these preferred embodiments may be made by those skilled in the art without departing from the scope of the following claims. For example, although a parallel-type separator is shown to describe a separator screen employing openings according to the invention, screen openings according to the invention may be employed in other types of separator screens such as separators employing a flat plate screen or flat grinding plate. In these flat screen forms of the invention, the openings must each include deflecting surfaces aligned sloping toward the screen surface in a direction substantially parallel to the direction that the rotating blade passes over the surfaces.

I claim:

1. A separator screen comprising:

(a) a screen body having a cylindrical inner surface, an input end, and an output end, with the direction from the input end to the output end defining a cutting direction;

(b) a plurality of screen openings formed in the screen body, each screen opening having a cross-sectional size sufficient for enabling a material to be separated to pass therethrough from within the area defined by the cylindrical inner surface of the screen body;

(c) an inner portion of each screen opening having a deflecting surface extending at an acute deflecting angle to the inner surface of the screen body; and (d) the deflecting surface of each screen opening sloping to meet the inner surface of the screen body in the cutting direction.

2. The separator screen of claim 1 wherein:

(a) each screen opening includes a cylindrical outer portion; and (b) the inner portion of each screen opening comprises a frustoconical surface which is disposed coaxially with the cylindrical outer portion, the larger end of the frustoconical shaped surface meeting the inner surface of the screen body.

3. The separator screen of claim 2 wherein each screen opening includes a convex curved transition surface extending between the inner portion and outer portion.

4. The separator screen of claim 1 wherein:

(a) each screen opening includes a cylindrical outer portion; and (b) the inner portion of each screen opening includes a portion of a second cylinder intersecting the screen body, said second cylinder having substantially the same diameter as the cylinder forming the screen opening outer portion, but with a longitudinal axis at said acute deflecting angle with respect to the screen surface and intersecting the Center axis of the cylinder forming the screen opening outer portion.

5. The separator screen of claim 4 wherein each screen opening includes a convex curved transition surface extending between the inner portion and outer portion.

6. The separator screen of claim 4 wherein the longitudinal axis of the second cylinder lies in a plane extending parallel to the cutting direction.

7. The separator screen of claim 1 wherein the acute deflecting angle is in a range from approximately 20 degrees to 15 degrees to the inner surface of the screen body.

8. The separator screen of claim 1 wherein the deflecting surface comprises a convex curved surface.

9. The separator screen of claim 1 wherein the inner portion comprises a generally frustoconical inner surface with the large end of the frustoconical shape meeting the inner surface of the separator screen and each screen opening further comprises:

(a) a cylindrical outer portion having a longitudinal axis offset from the longitudinal axis of the frustoconically shaped inner surface in a direction opposite to the cutting direction; and (b) a convex curved surface extending between the inner surface and the surface defining the cylindrical outer portion.

10. The separator screen of claim 1 wherein the acute deflecting angle is less than approximately 45 degrees to the inner surface of the screen.

11. A method of screening meat products from bone, the method comprising the steps of:

(a) compressing the combined meat products and bone against a screen surface having a plurality of screen openings therethrough for passing meat products therethrough while substantially blocking pieces of bone;

(b) periodically passing a cutting element across the screen surface in a cutting direction to cut meat product fibers at the screen surface; and (c) deflecting bone pieces out of the screen openings with a deflecting surface extending at an acute deflecting angle to the screen surface in the cutting dieection.

12. The method of claim 11 wherein the step of deflecting bone pieces out of the screen openings comprises:

(a) contacting the bone pieces extending into the screen openings between the cutting element and the deflecting surface.

13. The method of claim 11 including the step of:

(a) maintaining a cutting edge of the cutting element substantially perpendicular to the cutting direction during the step of passing the cutting element across the screen surface in the cutting direction.

14. In a separator apparatus for separating meat products from hard material, the apparatus having a separator screen with a plurality of screen openings for enabling said meat products to be separated to pass therethrough, and also having a cutting blade which passes over an inner surface of the separator screen in a cutting direction, the improvement comprising:

(a) an inner portion of each screen opening having a deflecting surface extending at an acute deflecting angle less than approximately 45 degrees to the inner surface of the screen body; and (b) the deflecting surface of each screen opening sloping to meet the inner surface of the screen body in the cutting direction for deflecting hard material pieces out of the respective screen opening as the cutting blade passes said opening.

15. The apparatus of claim 14 wherein:

(a) each screen opening includes a cylindrical outer portion; and (b) the inner portion of each screen opening comprises a frustoconical surface which is disposed coaxially with the cylindrical outer portion, the larger end of the frustoconical shaped surface meeting the inner surface of the screen body.

16. The apparatus of 14 wherein:

(a) each screen opening includes a cylindrical outer portion; and (b) the inner portion of each screen opening includes a portion of a second cylinder intersecting the screen body, said second cylinder having substantially the same diameter as the cylinder forming the screen opening outer portion, but with a longitudinal axis at said acute deflecting angle with respect to the screen surface and intersecting the center axis of the cylinder forming the screen opening outer portion.

17. The apparatus of claim 16 wherein the longitudinal axis of the second cylinder lies in a plane extending parallel to the cutting direction.

18. The apparatus of claim 14 wherein the acute deflecting angle is in the range from approximately 20 degrees to 15 degrees to the inner surface of the screen body.

19. The apparatus of claim 14 further comprising:

(a) a convex curved portion extending between the deflecting surface and an outer portion of the respective screen opening.

20. The apparatus of claim 14 wherein the deflecting surface comprises a convex curved surface.

21. The apparatus of claim 14 wherein the inner portion comprises a generally frustoconical inner surface with the large end of the frustoconical shape meeting the inner surface of the separator screen and each screen opening further comprises:

(a) a cylindrical outer portion having a longitudinal axis offset from the longitudinal axis of the frustoconically shaped inner surface in a direction opposite to the cutting direction; and (b) a convex curved surface extending between the inner surface and the surface defining the cylindrical outer portion.

* * * * *

UNITED STATES PATENT AND TRADEMARK OFFICE
CERTIFICATE OF CORRECTION

PATENT NO. : 5,597,352
DATED : January 28, 1997
INVENTOR(S) : Eldon Roth

It is certified that error appears in the above-indentified patent and that said Letters Patent is hereby corrected as shown below:

Column 3, line 65, change "operarig" to --opening --.

Column 4, line 12, change "my" to --may --.

Column 4, line 24, change "connectionwith" to --connection with --.

Column 4, line 25, change "slop" to --slope --.

Column 4, line 27, change "my" to --may --.

Column 5, line 15, after "passes." add the sentence --Additionally, the deflecting surface 56 may include a radiused portion where it intersect: the screen opening outer portion 52. --.

Column 6, line 9, after the words "18 degrees" add a --, --.

Column 6, line 63, change "Center" to --center--.

Column 7, line 36, of the claims, change "dieection" to --direction--.

Signed and Sealed this

Twenty-ninth Day of April, 1997

Attest:

BRUCE LEHMAN

Attesting Officer

Commissioner of Patents and Trademarks